United States Patent [19]
Kato

[11] Patent Number: 5,227,978
[45] Date of Patent: Jul. 13, 1993

[54] NUMERICAL CONTROL DEVICE WITH RATIONAL B-SPLINE INTERPOLATOR

[75] Inventor: Kiyotaka Kato, Amagasaki, Japan

[73] Assignee: Mitsubishi Denki Kabushiki Kaisha, Tokyo, Japan

[21] Appl. No.: 786,066

[22] Filed: Oct. 31, 1991

[30] Foreign Application Priority Data

Nov. 8, 1990 [JP] Japan ................. 2-305504

[51] Int. Cl.⁵ .................. G05B 19/18; G06F 15/46
[52] U.S. Cl. ................. 364/474.31; 364/474.23; 318/573
[58] Field of Search ............ 364/474.31, 474.23, 364/167.01, 474.29; 318/568.15, 567, 573

[56] References Cited

U.S. PATENT DOCUMENTS 4,591,968  5/1986  Nozawa et al. ............. 364/474.23
4,648,024  3/1987  Kato et al. ................ 318/573
4,797,811  1/1989  Kiyokawa et al. ........... 364/474.23

FOREIGN PATENT DOCUMENTS 2-36406  2/1990  Japan .
2-113305  4/1990  Japan .

OTHER PUBLICATIONS

"Programming for Numerical Control Machines", A. D. Roberts and R. C. Prentice, McGraw-Hill, Inc., 1968 (Japanese Version).
"Rational B-Splines for Curve and Surface", Wayne Tiller, *Computer Graphics and Applications*, 1983 IEEE.

*Primary Examiner*—Jerry Smith
*Assistant Examiner*—Steven R. Garland
*Attorney, Agent, or Firm*—Rothwell, Figg, Ernst & Kurz

[57] ABSTRACT

A numerical control device for controlling a machine tool or a robot accepts a mixed program including both conventional G-codes and codes for nonuniform rational B-spline. The blocks of G-codes and rational B-spline codes are discriminated by a respective head code or symbol. Once a set of order, number of control points, and knot vector is input via code blocks of a program, the same setting for the B-spline basis functions is used for generation of the rational B-spline curves until a new set of order, etc., are input.

2 Claims, 4 Drawing Sheets

NUMERICAL CONTROL DEVICE WITH RATIONAL B-SPLINE INTERPOLATOR

BACKGROUND OF THE INVENTION

This invention relates to numerical control devices for controlling machine tools and industrial robots.

Conventional numerical control devices are controlled by means of the so-called G-codes, which are described, for example, in A. D. Roberts and R. C. Prentice, "PROGRAMMING FOR NUMERICAL CONTROL MACHINES", 1968, McGraw-Hill, New York. The G-codes are fundamentally translation instructions for the linear (G01) or the circular arc movements (G02 or G03) of the machine. Thus, in the case where these movement instruction codes are utilized, the curves which cannot be represented by lines or circular arcs are approximated by means of short line segments. These approximating line segments, which are calculated before the execution of the control, are stored in an exterior storage medium such as an NC tape or a fixed disc. These data on line segments stored in an exterior medium are read out by the numerical control device when the machine tool is to be controlled.

The above conventional numerical control devices, however, has the following disadvantages. When curves that are not representable by lines and arcs are utilized, the curves are first converted into a large amount of short line segment data, which are stored in an exterior storage medium. Thus, an NC tape or a fixed disk of a large capacity is necessary. Further, the large amount of data on the line segments must be read out from the exterior storage medium and transmitted to the numerical control device during the execution of control. As a result, the overhead of the data transmission makes a high-speed control of the machine tool infeasible.

SUMMARY OF THE INVENTION

It is therefore an object of this invention to provide a numerical control device for controlling an effector machine such as a machine tool or an industrial robot which is capable of operating without an exterior memory medium for storing data for approximate line segments and which is capable of realizing a high-speed movement control of the effector machine.

The above object is accomplished in accordance with the principle of this invention by a numerical control device for controlling an effector machine such as a machine tool or a robot, comprising: a program input means via which is input a control program containing both a block of codes for a linear or a circular arc movement of said effector machine and a block of codes for generating a nonuniform rational B-spline curve along which said effector machine is to be moved, wherein said block of codes for a linear or circular arc movement and said block of codes for generating a nonuniform rational B-spline curve are marked by respective head codes; a code discriminator means for discriminating between said block of codes for a linear or a circular arc movement of said effector machine and said block of codes for generating a nonuniform rational B-spline curve; a G-code control means for controlling said effector machine in accordance with said block of codes for a linear or circular arc movement; and a B-spline interpolator means for generating an interpolation curve in accordance with said block of codes for generating a nonuniform rational B-spline curve.

Preferably, said block of codes for generating a nonuniform rational B-spline curve includes: blocks of codes for setting an order, a number of control points, and a knot vector; and a block of code for supplying data for control points; and once a set of said order, number of control points, and knot vector is input via code blocks of said program, said B-spline interpolator means generates an interpolation curve in accordance with the rational B-spline basis function settings specified by said set of order, number of control points, and knot vector, until a new set of order, number of control points, and knot vector is input.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 4 shows an example of a control program containing conventional G-code and B-spline interpolation data.

In the drawings, like reference numerals represent like or corresponding parts or portions.

DETAILED DESCRIPTION OF THE PREFERRED EMBODIMENT

Referring now to the accompanying drawings, the preferred embodiment of this invention is described.

Figure 1:
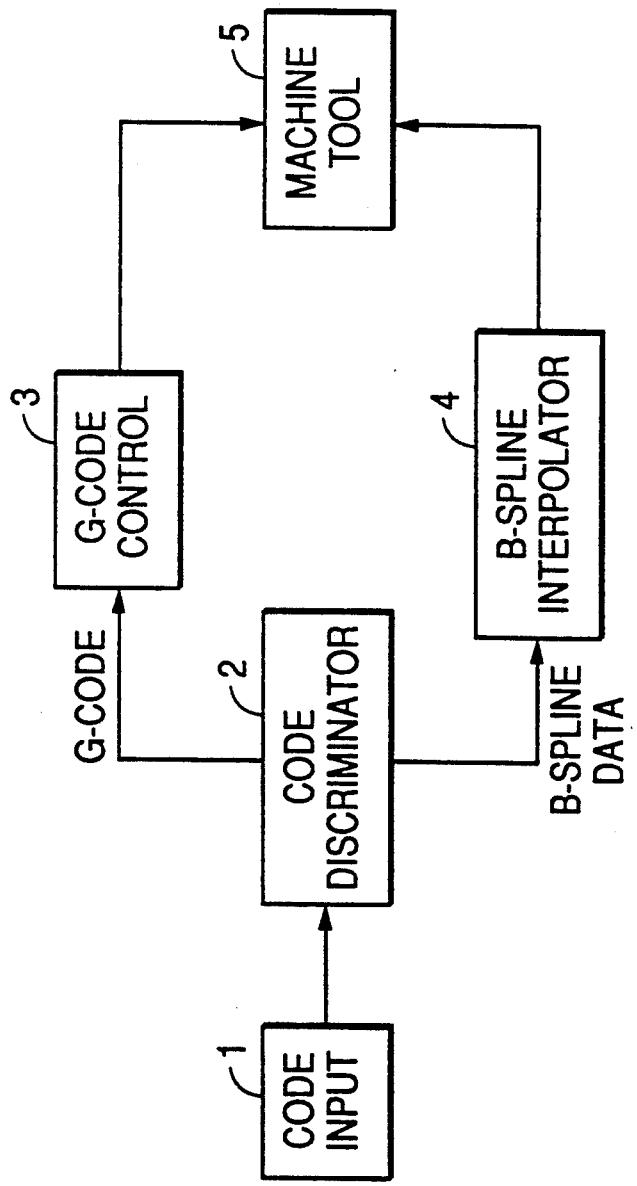
FIG. 1 is a block diagram showing the conceptual organization of numerical control device according to this invention.

FIG. 1 is a block diagram showing the conceptual organization of numerical control device according to this invention. The numerical control device includes: a program input means 1 via which the control program including both the conventional G-codes and nonuniform rational B-spline data are input; a code discriminator means 2 for discriminating between the G-codes and the nonuniform rational B-spline data; a G-code control means 3 for controlling the effector machine such as a machine tool 5 or an industrial robot; and a B-spline interpolator means 4 for generating interpolations in accordance with the B-spline data supplied from the code discriminator means 2.

Figure 2:
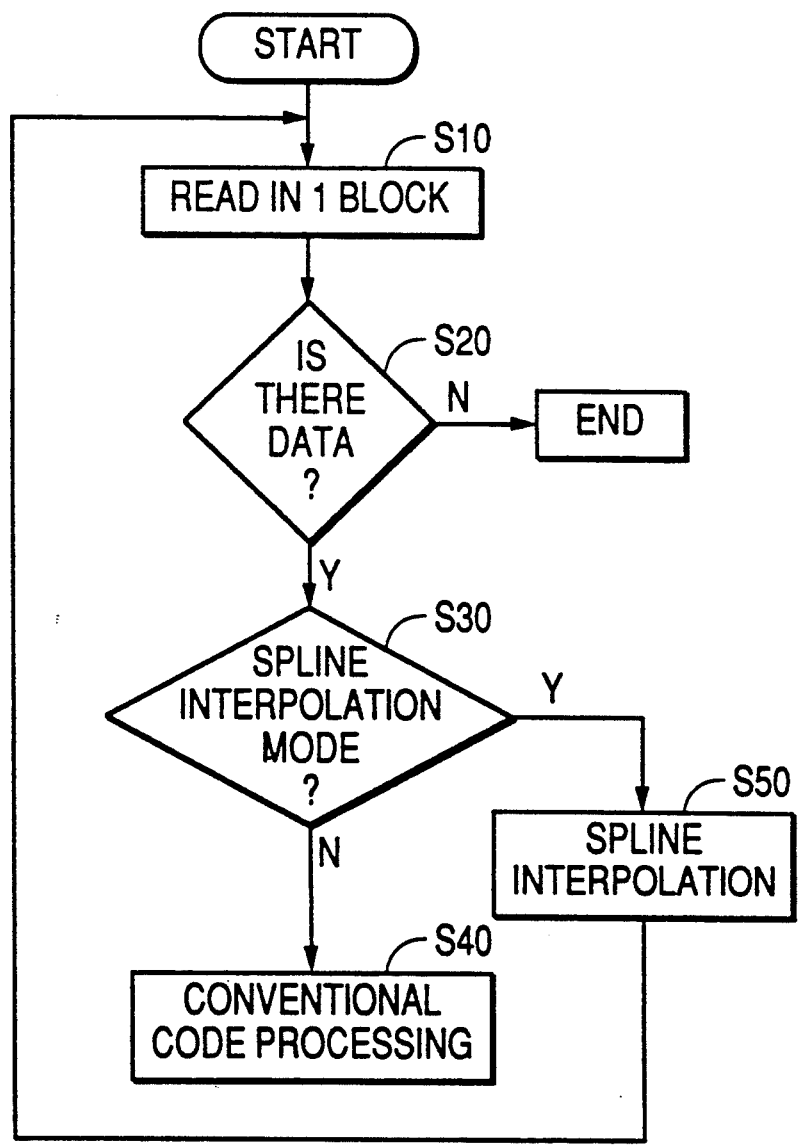
FIG. 2 is a flowchart showing the overall control procedure of the numerical control device of FIG. 1.
Figure 4:
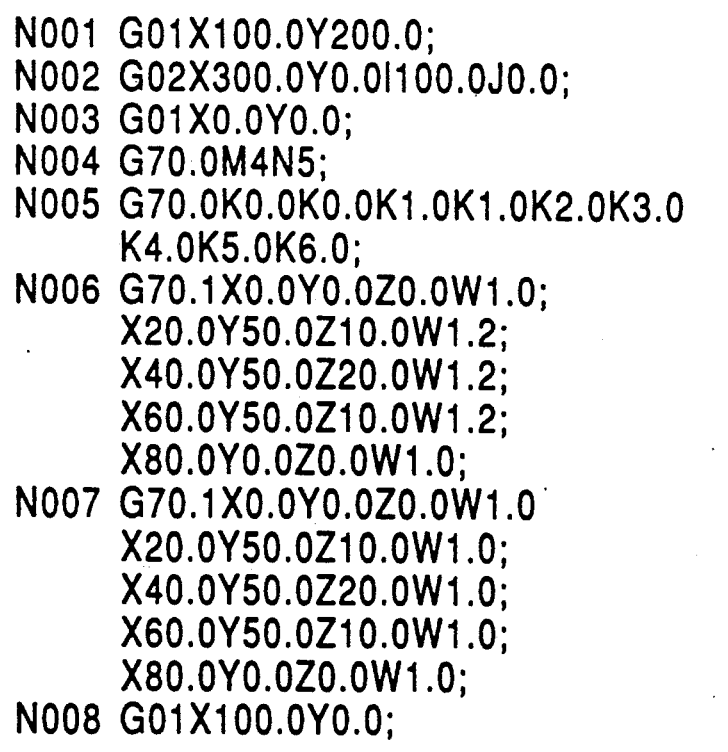

FIG. 2 is a flowchart showing the overall control procedure of the numerical control device of FIG. 1, and FIG. 4 shows an example of a control program containing conventional G-code and B-spline interpolation data. In FIG. 4, the sequential numbers N001 through N008 labels the respective blocks of codes. The code at the head of each block represent the species of the block. Thus, the codes G01, G02 at the head of the blocks N001, N002, N003, and N008 represent that the blocks contain conventional G-codes for a linear (G01) and an arc movement (G02), respectively. These conventional linear and circular arc movement codes are specified by the EIA (Electronic Industries Organization) or ISO (International Organization for Standardization). On the other hand, the codes G70.0 and G70.1 at the head of blocks N004 through N007 represent that the blocks contain nonuniform rational B-spline data, as described in detail below.

As shown in FIG. 2, each block of control program is read in via the program input means 1 at step S10, and it is judged, at the next step S20, whether or not the block contains control data. If there is no data, the procedure is terminated. If there is data in the block, the code discriminator means 2 determines at step S30 whether or not the data is the rational B-spline data. If the data is not the rational B-spline data and hence is the conventional G-code, the conventional line or arc movement control in accordance with the G-code scheme is effected by the G-code control means 3 at step S40. If the data is rational B-spline code, the rational B-spline interpolation is effected by the B-spline interpolator means 4, at step S50, as described in detail below.

The nonuniform rational B-spline is a versatile method of generating curves and is capable of representing any three-dimensional curves, including quadric primitives, such as circular and elliptic arcs, as well as free-form curves. In accordance with the nonuniform rational B-spline, a curve is represented by a parametric representation B(t):

$$B(t) = \left( \sum_{i=1}^{n} N_{i,k}(t) \, w_i \, P_i \right) / \left( \sum_{i=1}^{n} N_{i,k}(t) \, w_i \right)$$

where:

$P_i = (x_i, y_i, z_i)$ are the control points on the curve;

n is the number of control points;

t is the parameter ranging within a line segment $a \leq t \leq b$;

$N_{i,k}(t)$ are the k'th order polynomial B-spline basis functions; and $w_i$ are the weights for the respective control points $P_i$.

The nonuniform rational B-spline curve B(t) defines a mapping of the line segment $a \leq t \leq b$ into a three dimensional space.

The polynomial B-spline basis functions $N_{i,k}(t)$ of order k (degree k−1) is calculated from the values of the elements of a knot vector $\{t_i\}$ by means of a recurrence formula known as Cox-de Boor algorithm:

$$N_{i,k}(t) = \{(t - t_i)/(t_{i+k-1} - t_i)\} N_{i,k-1}(t) + \{(t_{i+k} - t)/(t_{i+k} - t_{i+1})\} N_{i+1,k-1}(t)$$

and $$N_{i,1}(t) = 1 \text{ (for } t_i \leq t \leq t_{i+1})$$

$$N_{i,1}(t) = 0 \text{ (otherwise)}$$

where the elements of the knot vector $\{t_i\}$ is contained in the line segment: $a \leq t_i \leq b$, and it is agreed that $0/0 = 0$. The nonuniform rational B-splines are discussed, for example, in W. Tiller, "Rational B-Splines for Curves and Surface Representation", IEEE CG & A (Computer Graphics and Applications), September 1983, pp. 61 through 69.

A particular representation of the nonuniform rational B-spline curve B(t) is thus determined when its order k, the number n of the control points $P_i$, the coordinates $(x_i, y_i, z_i)$ of the control points $P_i$, the weight $w_i$ for the respective control points, and elements of a knot vector $\{t_i\}$ are given.

According to this invention, the portion of the control program for the rational B-spline interpolation contains: (1) blocks for setting the order of the rational B-spline basis functions and the number of control points; (2) blocks for setting the knot vector; and (3) blocks for supplying the coordinates and the weights for the control points. The blocks of type (1) and (2) modifies the settings of rational B-spline functions $N_{i,k}(t)$ and are marked by a head code G70.0 in FIG. 4. On the other hand, the blocks of type (3) provides the data for the control points and are marked by head code G70.1 in FIG. 4.

Thus, in FIG. 4, the block N004 sets the order to 4 and the number of control points to 5. The symbol M represents that the following number is the order. The symbol N represents that the following number is the number of control points.

On the other hand, the block N005 sets the knot vector. The symbol K represents that the following number gives an element of the knot vector. The number of elements of the knot vector is equal to the sum of the order and the number of control points. In the example given in FIG. 4, the order is 4 and the number of control points is 5. Thus, the number of elements read in via the program input means 1 in the block N005 is equal to 9.

The blocks N006 and N007 both supply data for five control points. In each line, the numbers after the symbols X, Y, Z, gives the three-dimensional coordinates $(x_i, y_i, z_i)$ of the respective control points $P_i$. The number after the symbol W gives the weight $w_i$ for the control point $P_i$ specified by the preceding coordinate.

Once the rational B-spline basis functions are set via the blocks of type (1) and (2), the same settings are utilized for the following sets of control points until a new setting is input by means of new blocks of type (1) and (2). Thus, interpolation curves are generated by the same interpolation scheme for the two sets of control points the data of which are given in blocks N004 and the N005, respectively.

Figure 3:
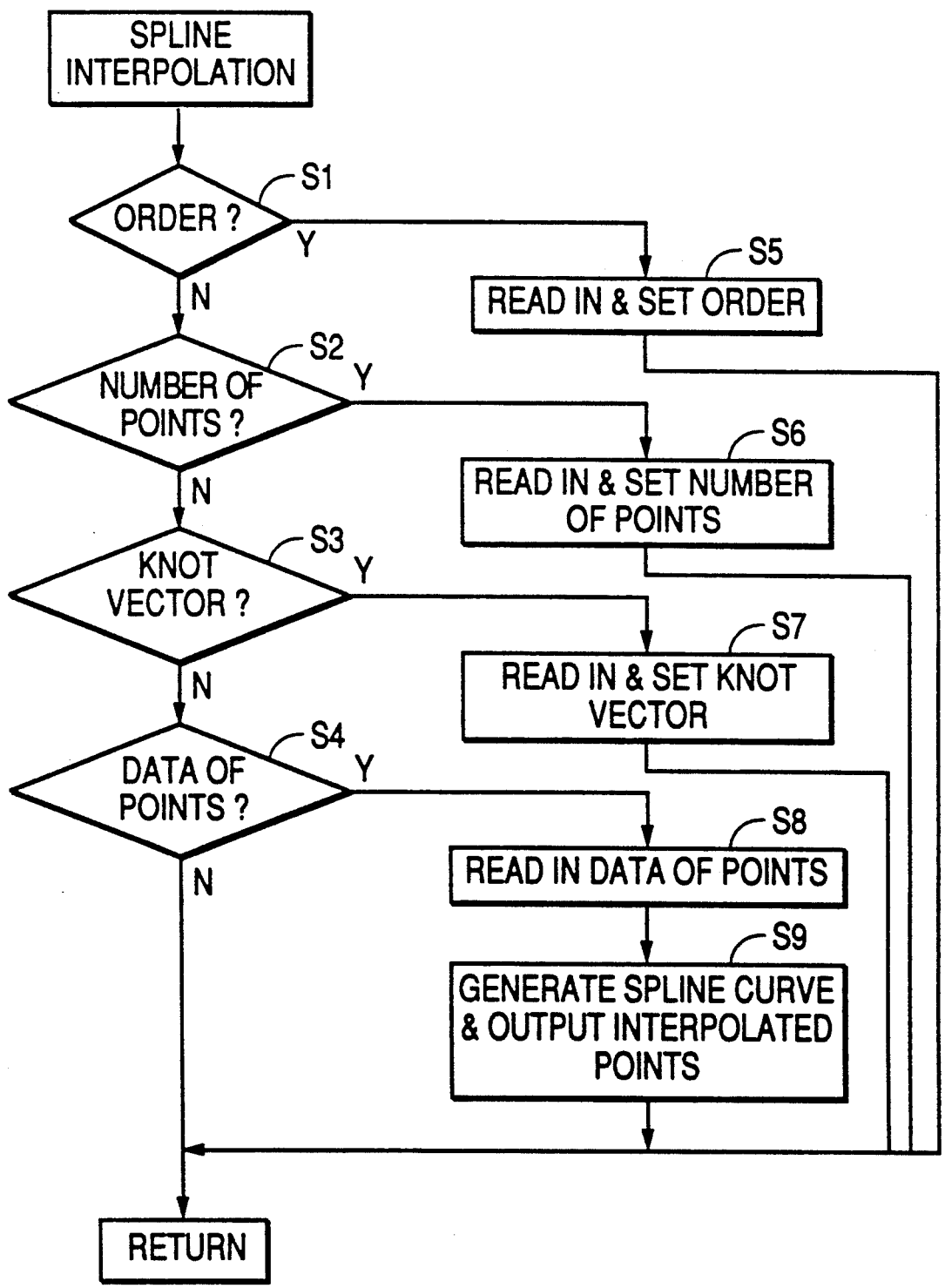
FIG. 3 is a flowchart showing the details of the spline interpolation procedure.

FIG. 3 is a flowchart showing the details of the spline interpolation procedure, which corresponds to step S50 in FIG. 2. It is successively judged whether the data which is read in is an input of the order (step S1), the number of control points (step S2), the knot vector (step S3), or the data for the control points (step S4). When it is judged at step S1 that the code is an input of the order, the order is read in and set in an interior register within the B-spline interpolator means 4 at step S5. When it is judged at step S2 that the code is an input of the number of control points, the number is read in and set in an interior register within the B-spline interpolator means 4 at step S6. When it is judged at step S3 that the code is an input of the knot vector, the elements $t_i$ of the knot vector $\{t_i\}$ are read in and set in an interior register within the B-spline interpolator means 4 at step S7.

When, on the other hand, it is judged at step S4 that the code is an input of data for the control points, the data (coordinates and the weights for the control points) are read in and stored within the B-spline interpolator means 4 at step S8. Further, at step S9, the rational B-spline curve B(t) is generated on the basis of the order, number of control points, and the knot vector set in the registers, utilizing the data for the control points stored within the B-spline interpolator means 4. The parameter t is moved from a to b ($a \leq t \leq b$) to generate the coordinates of the interpolation points. Thus, free-form curves are approximated by nonuniform rational B-spline curves B(t).

Thus, according to this invention, the nonuniform rational B-spline codes can be mixed with conventional linear and circular arc movement codes. Further, the code discriminator means 2 discriminates the nonuniform rational B-spline codes and the B-spline interpolator means 4 generates interpolation curves in accordance with the rational B-spline codes. Thus, the necessity for storing and transmitting a large amount of data for infinitesimal line segments for approximating free curves is eliminated.

What is claimed is:

1. A numerical control device for controlling an effector machine such as a machine tool or a robot, comprising:

program input means via which is input a control program containing both a block of codes for a linear or a circular arc movement of said effector machine and a block of codes for generating a nonuniform rational B-spline curve along which said effector machine is to be moved, wherein said block of codes for a linear or circular arc movement and said block of codes for generating a nonuniform rational B-spline curve are marked by respective head codes;

code discriminator means for discriminating between said block of codes for a linear or a circular arc movement of said effector machine and said block of codes for generating a nonuniform rational B-spline curve;

G-code control means for controlling said effector machine in accordance with said block of codes for a linear or circular arc movement; and B-spline interpolator means for generating an interpolation curve in accordance with said block of codes for generating a nonuniform rational B-spline curve.

2. A numerical control device as claimed in claim 1, wherein said block of codes for generating a nonuniform rational B-spline curve includes: blocks of codes for setting an order, a number of control points, and a knot vector; and a block of code for supplying data for control points; and once a set of said order, number of control points, and knot vector is input via code blocks of said program, said B-spline interpolator means generates an interpolation curve in accordance with the rational B-spline basis function settings specified by said set of order, number of control points, and knot vector, until a new set of order, number of control points, and knot vector is input.

* * * * *